UNITED STATES PATENT OFFICE.

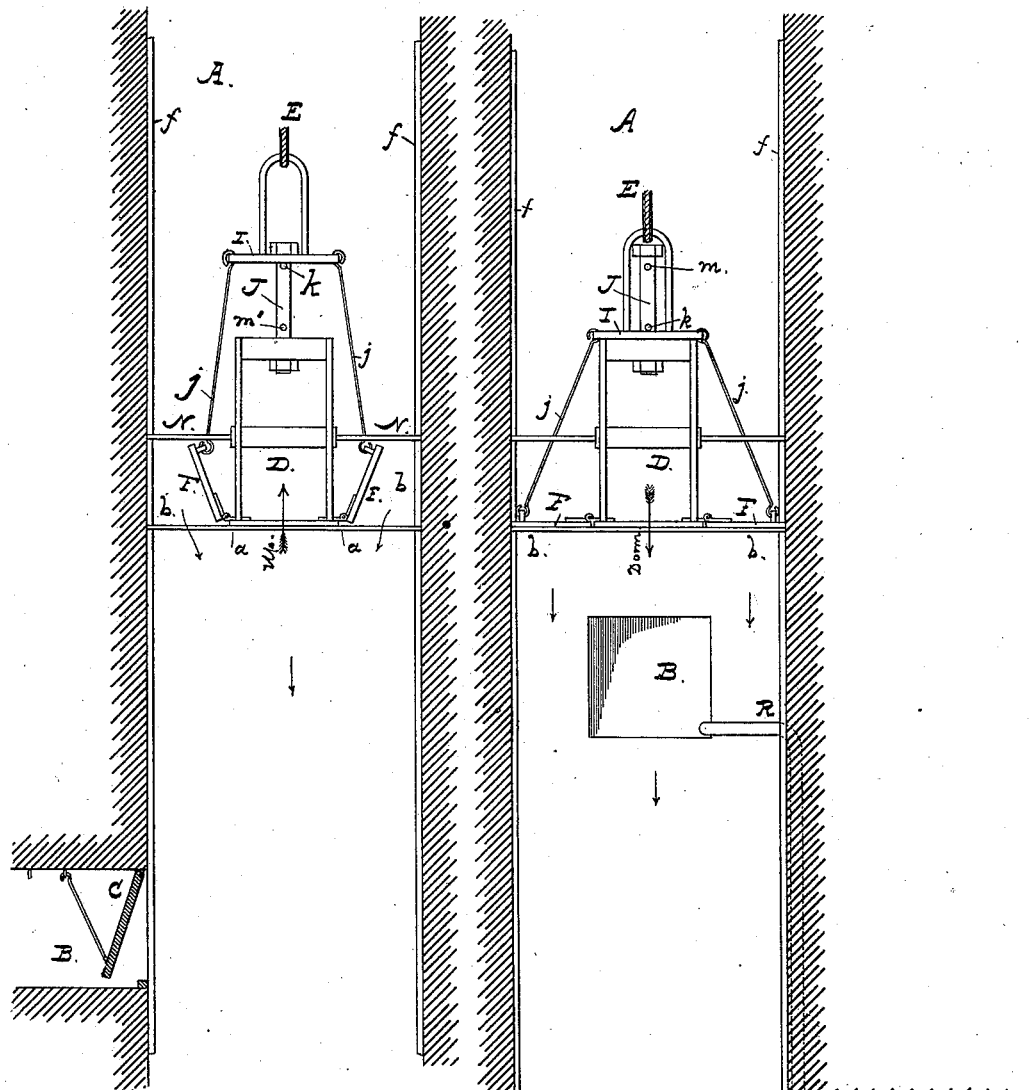

WILLIAM PHILLIPS, OF COOS BAY, OREGON.

MEANS FOR VENTILATING MINING SHAFTS AND TUNNELS.

SPECIFICATION forming part of Letters Patent No. 294,805, dated March 11, 1884.

Application filed October 18, 1882. (No model.)

*To all whom it may concern:*

Be it known that I, WILLIAM PHILLIPS, a citizen of the United States, residing at Coos Bay, Coos county, and State of Oregon, have made and invented a new and useful Means for Ventilating Mining Shafts and Tunnels and other Underground Passages; and I do hereby declare that the following is a full, clear, and exact description of the same, reference being had to the accompanying drawings.

My invention relates to a novel means of forcing down air into the shaft of a mine from the mouth or entrance thereof, so that it shall enter or can be led into levels, inclines, and other passages for ventilating purposes.

The following description fully explains the nature of my said invention and the manner in which I proceed to construct, apply, use, and operate the same, the accompanying drawings being referred to by figures and letters—that is to say:

Figure 1 represents a section through an upright shaft extending vertically downward from the surface, with the cage or platform in the act of ascending. Fig. 2 is a similar view with the cage in the act of descending. In this view is shown an accumulator to receive the air and distribute it at regular pressure through levels and other points below the surface. Fig. 3 is a plan of the bottom of the cage, looking down from the top.

A may be any shaft, and B the levels and other passages leading from it. C is a valve to govern the mouth of these openings. D is the cage; E, the hoisting-cable. $ff$ are guides for the cage.

To make the cage or hoisting-platform serve as a plunger, I proceed substantially as follows: I make the platform somewhat smaller one way than the width of the shaft, so that a space, as at $b\ b$, Figs. 1 and 2, is provided between the sides $a\ a$ of the platform and the adjacent sides of the shaft. To these sides of the platform I attach hinged sections F, that by suitable means are spread out and held horizontally to fill up the space between the platform and the sides of the shaft while the cage is traveling downward, but at the return movement are raised and held up to leave this space open. The other two sides of the platform run closely to the opposite sides of the shaft, and have no valves. Suitable mechanism is connected with these valves to operate them automatically as the cage begins to change its direction of travel, and to hold them in position during the movements up and down. In the construction here shown, this means consists of a movable cross-head, I, on an upright rod or shaft, J, which projects from the cross-head of the supporting-frame of the platform. From the sides of this movable head I connecting rods or wires $j$ are led down to the outer end of the hinged sections F, and as this head I is moved up or down, the sections are accordingly raised up or turned down horizontally outward. The two positions of the movable cross-head are controlled by a pin or bolt, $k$, taking into holes $m\ m'$ in the rod J. To raise and hold up the sections the movable head I is placed in the position shown in Fig. 1, and the bolt is inserted in the hole $m$ below it. This is the adjustment required during the upward movement of the cage. For the other position the movable head is placed as shown in Fig. 2, and the bolt is inserted in the hole $m'$ above it.

N N are guide-bars to produce steady motion of the platform. They embrace the upright guides $ff$ on the sides of the shaft and prevent such oscillation of the cage that would interfere with its proper working. The top one of these bars is seen in plan in the detail view, Fig. 3. The slots $p$ are for the rods $j$ to pass through.

At the mouth of the levels and other openings and passages I place a door or means for closing the aperture during the upward movement of the cage to prevent backflow of air into the shaft. This door is thus a single-acting valve operated to admit air into the passage as the cage is descending, but preventing its return while the cage moves upward. These valves are closed immediately after the passage of the cage past them in going up or down. In the drawings I have not shown any mechanical means for effecting this closing; but the valves are closed by hand. The air thus forced down the shaft can be let directly into the passage to be ventilated; or it can be collected in an accumulator placed at the bottom of the shaft, and thence led out to various points for use through suitable pipes, R, having cocks and valves for controlling and regulating the flow. This additional feature is illustrated in Fig. 2 of the drawings, P being an accumulator of any suitable construction, $q$ its inlet-valve, and R the air-conductors.

This improvement constitutes a novel method of taking air into mines and other localities connected with a shaft or tunnel.

Having thus fully described my invention, what I claim, and desire to secure by Letters Patent, is—

1. A cage for mining-shafts, provided with hinged sections F on its sides, and means, substantially as described, whereby said sections may be raised on the outside, to leave open spaces between the cage and shaft-walls, as set forth.

2. The combination, with the cage D and hinged sections F F on its sides, of the standard J, secured to the cage, cross-head I, capable of being moved thereon, and connecting rods or parts $j$, substantially as set forth.

Witness my hand and seal.

WILLIAM PHILLIPS. [L. S.]

Witnesses:
 WM. HALL,
 WILLIAM SOLLEY.